Figure 1:
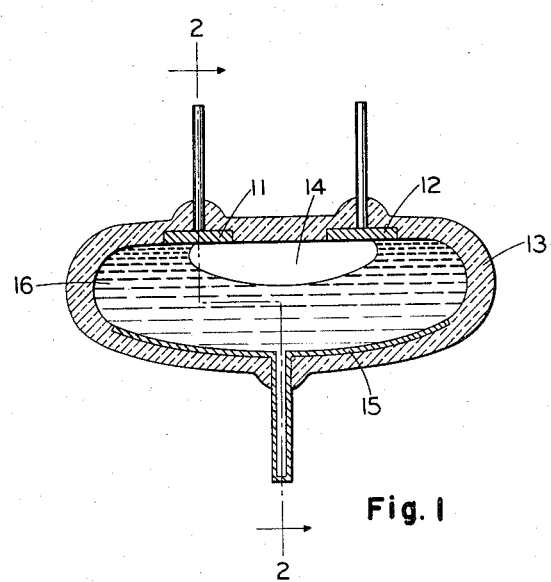

Sept. 16, 1958     H. R. BROADLEY, JR     2,852,646

LIQUID LEVEL SWITCH AND ELECTROLYTE

Filed June 11, 1956

Inventor:
Harry R. Broadley, Jr.
by Richard E. Hosley
His Attorney

United States Patent Office 2,852,646
Patented Sept. 16, 1958

2,852,646

LIQUID LEVEL SWITCH AND ELECTROLYTE

Harry R. Broadley, Jr., Reading, Mass., assignor to General Electric Company, a corporation of New York Application June 11, 1956, Serial No. 590,436

16 Claims. (Cl. 201—57)

This invention relates to liquid level switches and, more particularly, to liquid level switches containing electrolytes offering significant resistance to current flow. It has as one of its objects to provide an improved liquid level switch of this type as well as an improved electrolyte suitable for use in such a device.

Liquid level switches are generally used as sensing or control elements to indicate the amount of angular displacement from the horizontal of movable structures upon which they may be mounted, and in one application they function to control the erection of gyroverticals. Toward this end a switch of this type most often employs an electrolyte and bubble movable in a small enclosure having a gently curved upper surface. The resistance to electrical current flow between different electrodes disposed at various positions within the enclosure varies with the position of the bubble and, hence, with the angular displacement of the switch and associated structure.

Although mercury-filled liquid level switches are sometimes used, these provide only a simple ON-OFF action and a basic requirement of most liquid level switches is that the electrical conductivity between electrodes be a function, preferably linear, of tilt displacements. The precise resistance between any given pair of electrodes at any given position of the bubble depends upon a host of factors including the size and shape of the electrodes, the chemical composition and proportions of the electrolyte, the nature of the electrodes, and the ambient temperature.

Limitations on the performance of liquid level switches occur at low temperatures when the electrolyte freezes or becomes viscous and when its conductivity falls below the useful range. Other limitations occur at high temperatures when chemical decomposition results or when the materials used otherwise change their composition as by boiling. Chemical decomposition of an electrolyte will always occur when the switch is called upon to conduct direct currents for any sustained period of time, and, to prevent this, the switch is often operated with alternating currents of frequencies on the order of 400 cycles per second. Frequencies of 60 cycles per second will frequently destroy a liquid level switch when the higher frequency will not. However, even where the higher frequencies are used, there is an upper limit to the alternating current potential which can be applied to the switch beyond which decomposition of the electrolyte will occur.

It is accordingly an object of this invention to provide an improved liquid level switch and an electrolyte suitable for use therein having the characteristics of freedom from viscosity at very low temperatures, physical and chemical stability at elevated temperatures, electrical conductivities of useful values over very great temperature ranges, and a high decomposition voltage.

By way of a brief summary of but one aspect of this invention, I provide a liquid level cell having platinum electrode surfaces on which have been formed outer surfaces of platinic iodide. The electrolyte in this embodiment has the composition of sodium iodide dissolved in 0.1 M concentration in a solution of 80% by volume of ethylene glycol monomethyl ether and 20% methanol. The air bubble in this switch has a pressure of five atmospheres. I have found that a switch of this nature possesses the desirable properties described above over a temperature range of from 125° C. to −54° C., and can withstand potentials of up to 60 volts at 400 C. P. S. without chemical decomposition.

Figure 2:
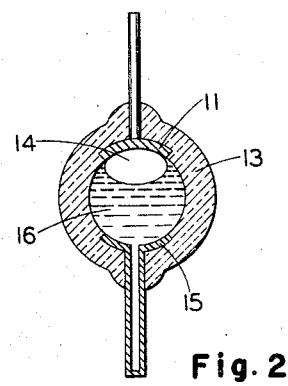

Although the scope of my invention is not to be limited except by a fair interpretation of the appended claims, the details of this invention, as well as further objects and advantages, may perhaps be better understood in connection with the accompanying drawings wherein:

Figure 1 represents a longitudinal cross-section view of a liquid level switch constructed in accordance with this invention; and Figure 2 represents a lateral cross-section view taken on line 2—2 of Figure 1.

In the figures, which are drawn to an enlarged scale, platinum electrodes 11 and 12 can be identified as having their faces flush with the inside top surface of glass enclosure 13. It is important in switches of this type that there be no projecting points or ridges against which bubble 14 might lodge in its travel over the inside surface of the enclosure, since for maximum sensitivity the bubble should be free to assume its own position. A third electrode 15 is arranged on the bottom of the enclosure and the resistance between this electrode and each of the upper electrodes is a measure of the degree and direction of tilt from the horizontal. I have preferred to construct this switch with a maximum length of seven-eighths inch and to give to the inside upper surface a radius of curvature as seen in Figure 1 of ten inches and as seen in Figure 2 of one-tenth of an inch. The upper electrodes have circular faces one-eighth inch in diameter and are spaced with their centers five-sixteenths of an inch apart. The lower electrode is large in proportion to the others and may cover the entire bottom surface of the enclosure. The particular switch shown is a single-axis switch; that is, it measures tilt about an axis normal to the plane of Figure 1. For two-axis sensing, it is common to provide a pair of switches of this general type arranged at right angles to each other or, alternatively, to provide a switch having the general configuration of an oblate spheroid and having four electrodes symmetrically arranged on the upper surface. It will be seen that the mechanical arrangement of parts of the switch is not an aspect of this invention and that the drawings, therefore, are purely illustrative in nature.

The electrolyte 16 consists of a suitable ionogen dissolved in a solvent. The ionogen most often selected for switches of this nature is an iodide salt of an alkali metal, and the one that I have found most satisfactory of this group is sodium iodide. Other alkali iodides may perform in a perfectly acceptable manner, but because of relative factors such as expense, commercial availability, and solubility, sodium iodide is generally to be preferred. It should be appreciated that the concentration of the salt in the solvent is not critical in most instances, but is a matter of choice with due regard to such factors as the conductance desired between electrodes under different temperature conditions, and the possibility that at very low temperatures higher concentrations of salt may crystallize out and affect the liquid characteristics of the switch. Even when the conductance of the switch is determined by the electrical system in which it is to operate, the concentration of the ionogen to be used is subject to variance since other factors affect conductance. Among those factors are the size of the switch, i. e., the cross sectional current carrying area; the physical area of the electrodes; the nature of the electrode; and the temperature conditions under which the switch is to operate.

I have found that when certain particular glycol ethers are used as the principal solvent for an alkali iodide, the resulting electrolyte possesses remarkable fluidity over a very wide temperature range, and very good physical, as well as chemical, stability. Furthermore, changes in resistance of the switch occasioned by large temperature variations remain within useful limits, and the switch is capable of withstanding very large impressed voltages compared to the decomposition voltages of prior liquid level switches. In particular, the glycol ethers identifiable as propylene glycol monomethyl ether and ethylene glycol monomethyl ether provide the electrolyte with these very desirable characteristics. Other glycol ethers fell short of the performance of the named compounds in various different ways. For example, many of the glycol ethers have considerable viscosities even at room temperature and are manifestly unsuitable for use in liquid level switches. Also, the boiling points of other glycol ethers are frequently so low that ambient temperatures up to 125° C. would present the serious possibility of failure of the switch due to fracture or explosion resulting from excessive vapor pressures.

The more complete description of the chemical composition which follows should be understood to be related to the dimensions of the particular switch shown and described. It should not be felt, therefore, that the practice of my invention is necessarily limited to the particular chemical proportions to be recommended. In general, I found concentrations of from 0.025 M to 0.5 M sodium iodide satisfactory for my purposes and it was from this range that concentrations were selected to give a 1000 to 3000 ohm resistance as measured between the lower electrode and a completely immersed upper electrode at room temperature.

One significant aspect of this invention was the discovery that, although the performance of the switches was very good when the air bubble had a pressure of one atmosphere, increases in pressure up to five atmospheres greatly improved the room temperature performance of the switches by increasing the decomposition potential. Beyond five atmospheres the voltage required to break down the switch again decreased. The reason for this peaking of performance at five atmospheres is as yet unknown.

Still another factor contributing to the performance of liquid level switches constructed and filled in accordance with this invention was the formation on the platinum electrodes of a thin layer of platinic iodide. With such a layer on the electrodes, the breakdown potential of the switch was as much as fifteen volts higher than that of switches having uncoated electrodes. It appeared on testing that the reversibility of the electrochemical reaction at the electrode surfaces is profoundly affected by the platinic iodide coating such that higher energies are required to complete the chemical dissociation which takes place momentarirly at the electrode surfaces during each half-cycle of the alternating excitation current.

The platinic iodide coating can be formed on the platinum electrodes in at least two very simple manners. Thus, by filling the switch with a sodium iodide electrolyte and subjecting it to temperatures up to 125° C. for 48 to 60 hours a very satisfactory coating is deposited. An excess of elemental iodine in solution will also contribute to the formation of the coating during heating. In still another way merely subjecting the switch to alternating current potentials in the normal operation range across its electrodes will cause the coating to develop.

By way of specific illustration of this invention, certain examples of switches embodying the improvements of this invention will now be discussed.

*Example A.*—A liquid level switch with platinic iodide coatings on platinum electrodes and containing an electrolyte consisting of sodium iodide dissolved in a 0.2 M concentration in pure propylene glycol monomethyl ether had a room temperature resistance of 2500 ohms. The ratio of its resistance at −54° C. to its resistance at 20° C., which I shall call the low temperature resistance ratio, was 47. Although this mixture has a rather high resistance at −54° C., by far the greatest amount of change in resistance occurred below −40° and the resistance was still within useful limits. The ratio of its resistance at 125° C. to its resistance at 20° C., which I shall call the high temperature resistance ratio, was 0.44. This is a very great improvement over prior switches of this type which could not even approach this high temperature condition without chemical decomposition, physical failure, or both. Throughout this great temperature range fluidity of the electrolyte was maintained. At one atmosphere internal pressure, the decomposition potential, which was determined by the voltage above which the resistance of the switch began significantly to vary from the Ohm's Law function, was 35 volts at 400 cycles A. C. This alone is high in comparison with prior switches which generally are incapable of functioning much beyond ten volts. However, it was found that when the pressure in the switch was increased to five atmospheres by the introduction of helium under pressure, the decomposition potential increased to a value between 55 and 60 volts. The chemical stability of the switch was evidenced by the fact that, although it was subjected to a severe life test, including continuous excitation of 45 volts, 400 C. P. S. at an ambient temperature of 125° C. for 1000 hours, its resistance during the entire period varied by no greater an amount than 10 to 12%.

*Example B.*—Another liquid level cell with platinic iodide coatings on platinum electrodes and containing an electrolyte consisting of sodium iodide dissolved in a 0.05 M concentration in pure ethylene glycol monomethyl ether had a room temperature resistance of 1000 ohms. The low temperature resistance ratio of this cell was only 21, while the high temperature resistance ratio was 0.62, both significant improvements over Example A. Once again, the electrolyte remained fluid over the entire temperature range, and the decomposition potential, which was a high 48 volts at one atmosphere internal pressure, was increased to 62 volts when the pressure was increased to five atmospheres by the addition of helium under pressure. When subjected to the same life test of 45 volts, 400 C. P. S. excitation, at 125° C. ambient temperature for 1000 hours, the maximum variation in its resistance during the test was only 9%, sufficient proof of its chemical and electrical stability.

It should not be felt that the electrolyte is necessarily limited to one employing as a solvent 100% of one of the specified glycol ethers. The addition of some materials to the electrolyte will, of course, deleteriously affect the switch and its operation. For example, any material which would tend to make the electrolyte viscous would not be an advantageous addition agent. Furthermore, although it is not uncommon to add water in different amounts to some electrolytic switches, especially those employing alcohols as basic solvents, I have found that the addition of appreciable amounts of water to the basic solvents herein disclosed robs the switch of one of its most significant features by decreasing its chemical stability. Under electrical excitation the water in the switch undergoes electrolysis with the consequent formation of large internal pressures which will in time destroy the switch. On the other hand, there can be no objection to the introduction of other ingredients which do not materially affect the basic and novel characteristics of the electrolyte in a harmful manner.

I have found, for example, that the mixture of methanol in amounts up to 50% by volume with ethylene glycol monomethyl ether as a basic solvent has the effect of improving the performance of the switch by decreasing the low temperature resistance ratio and, in certain proportions, by significantly decreasing the percent variation in resistance occurring during the aforementioned life test.

*Example C.*—A liquid level switch employing coated electrodes as before and containing an electrolyte consisting of 0.10 M sodium iodide in a solvent having 80% by volume ethylene glycol monomethyl ether and 20% methanol exhibited a room temperature resistance of 1000 ohms. Its low temperature resistance ratio was brought down to 7.25, which was a significant improvement over Example B, and the high temperature resistance ratio was 0.37. In the same life test described in connection with Examples A and B the stability of this switch was proven by no greater a variation in its resistance than 4%. As filled, the switch had an internal pressure of one atmosphere, and the decomposition potential was approximately 60 volts at 400 C. P. S.

*Example D.*—A liquid level switch employing coated electrodes as before and containing an electrolyte of 0.10 M sodium iodide in a solvent containing 50% ethylene glycol monomethyl ether by volume and 50% methanol had a 1000 ohm room temperature resistance. Its low temperature resistance ratio was down to 4.5 and its high temperature resistance ratio, as in Example C, was 0.37. This switch survived the life test with a maximum resistance variation of 5% and its decomposition potential, too, was about 60 volts at 400 C. P. S.

Besides the proportions described in Examples C and D, other percentages between 10% and 50% of methanol in ethylene glycol methyl ether were found to have beneficial effects upon the low temperature resistance ratio of the switch. However, there was again noted a peaking of performance at certain optimum values. Thus, 10% methanol was found not to provide an optimum low temperature resistance ratio, and percentages intermediate 20% and 50% seemed chemically unstable since for these values the range of resistance variation during a 1000 hour life test was great. For example, these ranges were 25% at 30% methanol and 29% at 40% methanol. The addition of methanol in amounts in excess of 50% begins to change the basic nature of the solvent and tests showed that the performance of the electrolyte approached that to be expected of pure methanol with an iodide salt in solution. Although the addition of methanol to ethylene glycol monomethyl ether proved beneficial in varying degrees, the combination of methanol with propylene glycol monomethyl ether to improve the low temperature characteristics of the latter compound proved chemically unstable in operation.

In both Examples C and D, as in other samples representing groups A and B, it was found that if the switch were filled at a pressure of one atmosphere and subsequently heat treated at temperatures up to 125°, the room temperature pressure in the switch was found to increase to values up to five atmospheres. Furthermore, a platinic iodide coating formed on the electrodes if there had not previously been one.

Although certain embodiments of my invention have been described in detail, it is to be understood that they are illustrative, not limiting, in nature and that numerous variations and modifications may be made within the spirit and scope of these teachings without departing from this invention in its broader aspects.

What I claim as new and desire to secure by Letters Patent of the United States is:

1. An electrolyte suitable for use in liquid level cells comprising: an alkali iodide dissolved in a liquid solvent consisting essentially of one of the materials from the class consisting of propylene glycol monomethyl ether and ethylene glycol monomethyl ether.

2. An electrolyte suitable for use in liquid level cells comprising: an alkali iodide dissolved in a liquid solvent consisting essentially of propylene glycol monomethyl ether.

3. An electrolyte suitable for use in liquid level cells comprising: an alkali iodide dissolved in a liquid solvent consisting essentially of ethylene glycol monomethyl ether.

4. An electrolyte suitable for use in liquid level cells comprising: an alkali iodide dissolved in a liquid solvent consisting essentially of four parts ethylene glycol monomethyl ether and from one to four parts methanol.

5. An electrolyte suitable for use in liquid level cells comprising: an alkali iodide dissolved in a liquid solvent consisting essentially of four parts ethylene glycol monomethyl ether and one part methanol.

6. An electrolyte suitable for use in liquid level cells comprising: an alkali iodide dissolved in a liquid solvent consisting essentially of one part ethylene glycol monomethyl ether and one part methanol.

7. A liquid level cell comprising: a hollow enclosure; electrodes extending into said enclosure from the outside thereof; a coating of platinic iodide on the surfaces of said electrodes within said enclosure; an electrically conducting liquid filling less than the entire volume within said enclosure and comprising an alkali iodide dissolved in a liquid solvent consisting essentially of one of the materials from the class consisting of propylene glycol monomethyl ether and ethylene glycol monomethyl ether; and a gaseous substance filling the remaining volume within said enclosure under a pressure of from one to five atmospheres.

8. A liquid level cell comprising: a hollow enclosure; electrodes extending into said enclosure from the outside thereof; a coating of platinic iodide on the surfaces of said electrodes within said enclosure; an electrically conducting liquid filling less than the entire volume within said enclosure and comprising an alkali iodide dissolved in a liquid solvent consisting essentially of propylene glycol monomethyl ether; and a gaseous substance filling the remaining volume within said enclosure under a pressure of from one to five atmospheres.

9. A liquid level cell comprising: a hollow enclosure; electrodes extending into said enclosure from the outside thereof; a coating of platinic iodide on the surfaces of said electrodes within said enclosure; an electrically conducting liquid filling less than the entire volume within said enclosure and comprising an alkali iodide dissolved in a liquid solvent consisting essentially of ethylene glycol monomethyl ether; and a gaseous substance filling the remaining volume within said enclosure under a pressure of from one to five atmospheres.

10. A liquid level cell comprising: a hollow enclosure; electrodes extending into said enclosure from the outside thereof; a coating of platinic iodide on the surfaces of said electrodes within said enclosure; an electrically conducting liquid filling less than the entire volume within said enclosure and comprising an alkali iodide dissolved in a liquid solvent consisting essentially of four parts ethylene glycol monomethyl ether and from one to four parts methanol; and a gaseous substance filling the remaining volume within said enclosure under a pressure of from one to five atmospheres.

11. A liquid level cell comprising: a hollow enclosure; electrodes extending into said enclosure from the outside thereof; a coating of platinic iodide on the surfaces of said electrodes within said enclosure; an electrically conducting liquid filling less than the entire volume within said enclosure and comprising an alkali iodide dissolved in a liquid solvent consisting essentially of four parts ethylene glycol monomethyl ether and one part methanol; and a gaseous substance filling the remaining volume within said enclosure under a pressure of from one to five atmospheres.

12. A liquid level cell comprising: a hollow enclosure; electrodes extending into said enclosure from the outside thereof; a coating of platinic iodide on the surfaces of said electrodes within said enclosure; an electrically conducting liquid filling less than the entire volume within said enclosure and comprising an alkali iodide dissolved in a liquid solvent consisting essentially of one part ethylene glycol monomethyl ether and one part methanol;

and a gaseous substance filling the remaining volume within said enclosure under a pressure of from one to five atmospheres.

13. A liquid level cell comprising: a hollow enclosure; platinum electrodes extending into said enclosure from the outside thereof; an electrolyte filling less than the entire volume within said enclosure comprising an alkali iodide dissolved in a liquid solvent consisting essentially of one of the materials from the class consisting of propylene glycol monomethyl ether and ethylene glycol monomethyl ether; and a gaseous substance filling the remaining free space within said enclosure under a pressure of from one to five atmospheres.

14. A liquid level cell comprising: a hollow enclosure; electrodes extending into said enclosure from the outside thereof; an electrolyte filling less than the entire volume within said enclosure comprising an alkali iodide dissolved in a liquid solvent consisting essentially of one of the materials from the class consisting of propylene glycol monomethyl ether and ethylene glycol monomethyl ether; and a gaseous substance filling the remaining free space within said enclosure under a pressure of from one to five atmospheres.

15. A liquid level cell comprising: a hollow enclosure; electrodes extending into said enclosure from the outside thereof; a coating of platinic iodide on the surfaces of said electrodes within said enclosure; an electrolyte filling less than the entire volume within said enclosure comprising an alkali iodide dissolved in a liquid solvent consisting essentially of one of the materials from the class consisting of propylene glycol monomethyl ether and ethylene glycol monomethyl ether.

16. A liquid level cell comprising: a hollow enclosure; electrodes extending into said enclosure from the outside thereof; an electrolyte filling less than the entire volume within said enclosure comprising an alkali iodide dissolved in a liquid solvent consisting essentially of one of the materials from the class consisting of propylene glycol monomethyl ether and ethylene glycol monomethyl ether.

References Cited in the file of this patent

UNITED STATES PATENTS

| | | |
|---|---|---|
| 2,367,465 | Kunzer | Jan. 16, 1945 |
| 2,505,180 | Georgien | Apr. 25, 1950 |